United States Patent [19]

McMahan et al.

[11] Patent Number: 5,717,743

[45] Date of Patent: Feb. 10, 1998

[54] TRANSPARENT TELEPHONE ACCESS SYSTEM USING VOICE AUTHORIZATION

[75] Inventors: Michael L. McMahan, Plano; Gerhard P. H. Deffner, Dallas; Billy W. Hensley, Garland, all of Tex.

[73] Assignee: Texas Instruments Incorporated, Dallas, Tex.

[21] Appl. No.: 736,065

[22] Filed: Oct. 23, 1996

Related U.S. Application Data

[63] Continuation of Ser. No. 493,296, Jun. 21, 1995, abandoned, which is a continuation of Ser. No. 267,266, Jun. 28, 1994, abandoned, which is a continuation of Ser. No. 991,626, Dec. 16, 1992, abandoned.

[51] Int. Cl.$^6$ .................................................. H04M 3/00
[52] U.S. Cl. .................... 379/188; 379/67; 379/200; 379/355; 395/2.53; 395/2.79
[58] Field of Search .......................... 379/67, 70, 80, 379/88, 89, 188, 189, 200, 355; 381/42, 43; 395/2.79, 2.82, 2.52, 2.53, 2.54, 2.84

[56] References Cited

U.S. PATENT DOCUMENTS

| | | | |
|---|---|---|---|
| 4,292,471 | 9/1981 | Kuhn et al. | 381/42 |
| 4,363,102 | 12/1982 | Holmgren et al. | 381/42 |
| 4,837,804 | 6/1989 | Akita | 381/42 |
| 4,853,953 | 8/1989 | Fujisaki | 379/88 |
| 4,864,622 | 9/1989 | Iida et al. | 381/43 |
| 4,870,686 | 9/1989 | Gerson et al. | 379/355 |
| 4,896,346 | 1/1990 | Belfield et al. | 379/88 |
| 4,998,279 | 3/1991 | Weiss | 379/88 |
| 5,033,088 | 7/1991 | Shipman | 381/43 |
| 5,091,947 | 2/1992 | Ariyoshi et al. | 379/88 |
| 5,125,022 | 6/1992 | Hunt et al. | 379/88 |
| 5,165,095 | 11/1992 | Borenerding | 379/88 |
| 5,166,971 | 11/1992 | Vollert | 379/88 |
| 5,208,848 | 5/1993 | Pula | 379/88 |
| 5,274,695 | 12/1993 | Green | 379/88 |
| 5,297,183 | 3/1994 | Bareis et al. | 379/67 |
| 5,315,649 | 5/1994 | Foster et al. | 379/355 |
| 5,325,421 | 6/1994 | Hou et al. | 379/67 |
| 5,369,685 | 11/1994 | Kero | 379/67 |
| 5,566,229 | 10/1996 | Hou et al. | 379/88 |

FOREIGN PATENT DOCUMENTS

| | | | |
|---|---|---|---|
| 3049048 | 7/1982 | Germany | 379/355 |
| 3422409 | 12/1985 | Germany | 379/355 |
| 62-105558 | 5/1987 | Japan | 379/355 |

OTHER PUBLICATIONS

Description, installation, operation and maintenance manual for Northern Telecom Limited's integrated services network: *Meridian© M3000 Touchphone©; Practice 553-2201-115, Issued: 1986 Jul. 29, Standard, Printed in the U.S.A.;* ©/Northern Telecom Limited 1986; 7 Chapters w/total/68 pp.

"Voice Dialer", Electrical Communications (ITT) vol. 59, No. 3, 6 May 1985 pp. 281-285, Immendorfer.

*Primary Examiner*—Krista M. Zele
*Assistant Examiner*—Scott L. Weaver
*Attorney, Agent, or Firm*—Bret J. Petersen; James Kesterson; Richard Donaldson

[57] ABSTRACT

A transparent telephone access system using voice authorization includes a method and system (30 and 60) to protect against the unauthorized use of telephone network (20). By receiving a spoken telephone number (14) from telephone unit (16) and recognizing the spoken phrase that corresponds to telephone number (24), the method and system permit transmission through telephone network (20) to telephone (22). The method and system record spoken phrase (14) in voice recognition server system (18). For the spoken phrase, a voice-template is formed and compared with a voice template formed from a composed phrase including pre-existing or stored spoken digits. In response to the comparison, use of telephone system (16) through telephone network (20) is permitted.

11 Claims, 2 Drawing Sheets

TRANSPARENT TELEPHONE ACCESS SYSTEM USING VOICE AUTHORIZATION

This application is a Continuation of application Ser. No. 08/493,296, filed Jun. 21, 1995 now abandoned, which is a Continuation of Ser. No. 08/267,266, filed Jun. 28, 1994 abandoned, which is a continuation of Ser. No. 07/991,626, filed Dec. 16, 1992 abandoned.

TECHNICAL FIELD OF THE INVENTION

The present invention generally relates to telephone systems and, more particularly, to a transparent telephone access system using voice authorization to protect against unauthorized use of a telephone system associated with a continuous-digit voice recognition system.

BACKGROUND OF THE INVENTION

Fraud is a major problem in the telephone industry and, in at least one respect, amounts to someone using the telephone unit of another person to the financial detriment of the other person. In most instances, this is done by the perpetrator making calls on a separate telephone and misusing telephone billing and accounting systems so that the other person receives the charges for the perpetrator's time on the telephone line. Fraud occurs in essentially all portions of the telephone industry, including credit card long-distance services, direct line or hard-wired business services, and in the cellular telephone services industries, to name but a few places. In each of these telephone service industry portions or segments, there is the common aspect of a unique identification number or signal that a fraud perpetrator copies or steals to commit the fraud.

When a cellular telephone user makes a call, for example, the cellular telephone sends a unique identification signal to the cellular network to indicate that it is an authorized instrument. No attempt is made, however, to ensure that the caller himself is authorized. Consequently, anyone can use the cellular telephone, and it is even possible to steal or copy the cellular telephone identification signal. For example, electronic devices exist that when placed roadside, pick up the unique cellular telephone identification signal from a cellular telephone passing by and record it for later use. With this recorded signal, anyone can use another telephone programmed to emit this signal. The cellular service provider will charge these calls to the owner of the telephone that passed by. This technique opens up the possibility for extensive fraud and abuse in the cellular telephone industry.

These problems and similar ones in other types of telephone services could be eliminated if a telephone authorization method and system existed to identify authorized callers. Voice prints offer that possibility. Unfortunately, telephone callers who are comfortable with the ease of using their current telephones may not like having to speak a password prior to every call. This process could add approximately 10 seconds to each telephone call. For example, a voice authorization call sequence would begin by the user voice-dialing the desired telephone number and pressing the SEND button or sending a similar signal to initiate the call. Then, the telephone system would prompt the user for a password. In response to receiving the password, the system would verify the caller identity and place the call. The cumbersome procedure that this approach contemplates places an effective and undesirable penalty on all telephone users in the name of protecting them against fraud. No other existing system provides a more attractive alternative, however.

Therefore, a need exists for a transparent telephone system voice authorization method and system that protects against the unauthorized use of a telephone unit associated with a continuous-digit voice recognition server system in a wide variety of telephone systems including, for example, voice-activated credit card, business direct line, and cellular telephone systems.

SUMMARY OF THE INVENTION

The present invention, accordingly, provides a transparent telephone system voice authorization method and system that protects against the unauthorized use of a telephone unit associated with a continuous-digit voice recognition server system and a telephone network and substantially eliminates or reduces disadvantages and problems associated with prior telephone unit user authorization methods and systems.

One aspect of the present invention is a transparent telephone unit voice authorization method that protects against the unauthorized use of a telephone unit by first having the user send from the telephone unit a spoken phrase having a plurality of spoken digits to dial another telephone unit. The method further converts the spoken phrase into a telephone number using a continuous-digit voice recognition server system. The method includes the step of transmitting the telephone number to the telephone network as well as recording the spoken phrase in the voice recognition server system. The method of the present invention is then to verify the user's identification based on comparing a new voice template formed from the entire spoken phrase to a stored voice template of the entire phrase that the voice recognition server system composes from voice templates of stored digits corresponding to the spoken digits. The method permits use of the telephone network through the telephone unit in the event that the new voice template differs from the stored voice template by less than a pre-determined degree.

A technical advantage of the present invention is that it eliminates the extra step necessary to explicitly have a user say a password to verify his identity. According to the present invention, the user only needs to voice-dial the number of the telephone he seeks to call. This provides a voice sample for generating a voice signature that can be used for the verification process. A difference between this technique and prior methods is that the present invention requires no fixed or user-defined password. Instead, the method and system of the present invention use the voice signature of the spoken telephone number digit sequence or phrase as the password.

Another technical advantage of the present invention is that it reduces significantly the time required to complete a voice-dialed telephone call. By not having to say or key a password, the present invention saves the user as much as 10 seconds or more on making each call.

Yet another technical advantage of the present invention is that user acceptance is increased for the speaker verification function. This substantially reduces the service provider's exposure to a dishonest person perpetrating fraud of the telephone network.

Another technical advantage of the present invention is increased security by not requiring a fixed password. Because the present invention uses a voice signature instead of a password, it combats the use of recording devices to defeat system security.

BRIEF DESCRIPTION OF THE DRAWINGS

The invention and its modes of use and advantages are best understood by reference to the following description of illustrative embodiments when read in conjunction with the accompanying drawings, wherein.

DETAILED DESCRIPTION OF THE INVENTION

The preferred embodiment of the present invention is best understood by referring to the FIGUREs, wherein like numerals are used for like and corresponding parts of the various drawings.

Figure 1:
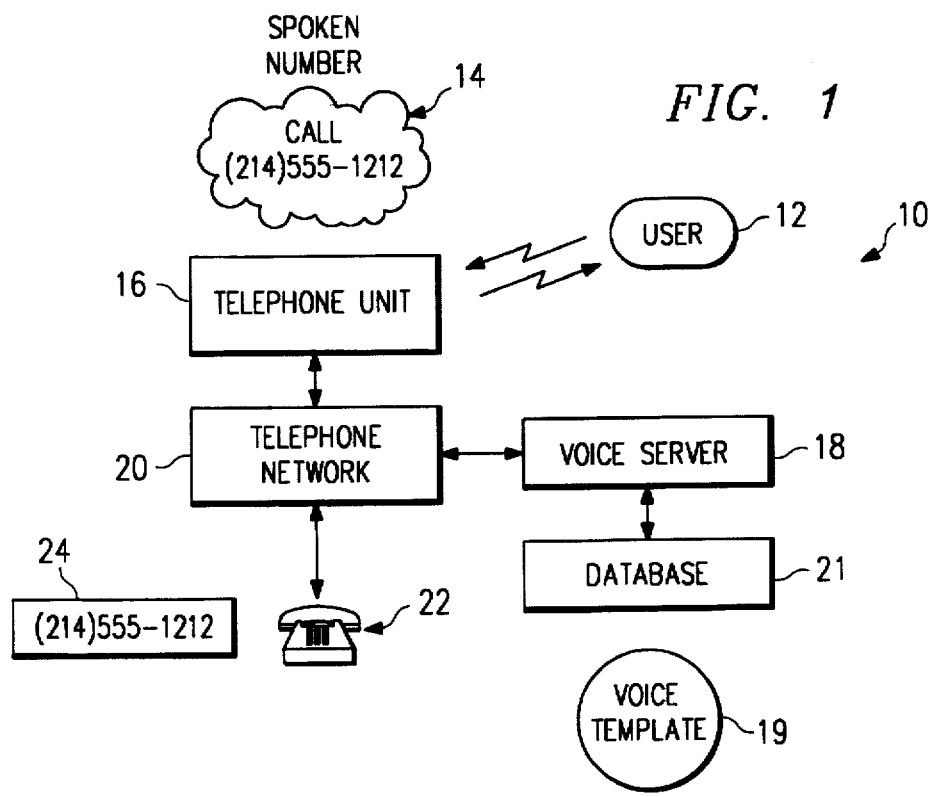
FIG. 1 provides a conceptual illustration of the scenario for using the preferred embodiment.

FIG. 1 shows a scenario 10 for use of the method and system of the preferred embodiment. That is, user 12 communicates a command 14, for example, "Call 214-555-1212," to telephone unit 16. Telephone unit 16 communicates command 14 via the telephone network 20 to voiceserver unit 18. Voiceserver unit 18 is a voice recognition server system that includes numerous voice templates such as voice template 19 that are stored in database 21. Voiceserver unit 18 performs an interaction with the user aimed at verifying the user's identity via voice recognition. If authentication is successful, voiceserver unit 18 causes telephone network 20 to permit user 12 to reach destination telephone 22 having telephone number 24. The preferred embodiment of the present invention operates within this scenario which may apply to cellular telephone systems, credit-card telephone systems, direct-dial or hard-wired telephone systems, and other similar systems.

Figure 2:
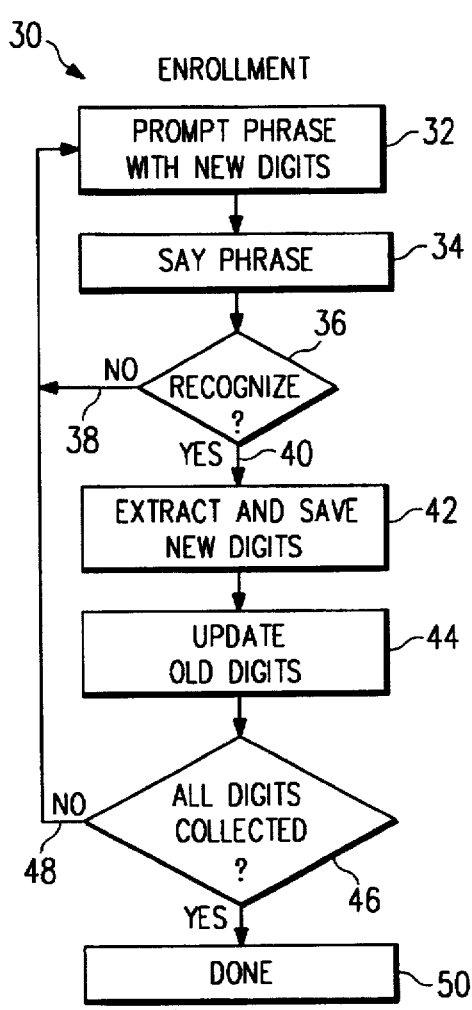
FIG. 2 shows a block diagram of the steps and data flow for one embodiment of the enrollment process of the present invention.

FIG. 2 shows enrollment process 30 of one embodiment of the invention. Enrollment process 30 begins at block 32 at which point the user is prompted to say a phrase with new digits. In response to prompt of block 32, user 12 at block 34, says the new digit phrase. Then, voiceserver unit 18 determines whether it recognizes the phrase as the new digit phrase that was specified at block 32. This recognition query occurs at block 36 of flow chart 30. If voiceserver unit 18 does not recognize the phrase, then along path 38 control goes to block 32, where the user is re-prompted to say a new digit phrase. On the other hand, if voiceserver unit 18 recognizes the spoken phrase as the new digit phrase of block 32, then voiceserver 18 extracts and saves the new digits as indicated at block 42. Then, at block 44, voiceserver unit 18 updates old digits that are stored as voice template 19 within database 21 of FIG. 1. The next step of enrollment process 30 is a query, at block 46, of whether all necessary digits are collected to recognize a sufficiently large number of digits in most spoken phrases. If not, control passes along path 48 to block 32 at which user 12 is re-prompted with a phrase of new digits. If all the necessary digits are collected, then enrollment process flow continues to block 50 at which voiceserver unit 18 indicates that it has completed the enrollment process.

In implementing the enrollment process 30 of FIG. 2, therefore, it is necessary that voiceserver unit 18 obtain a sample from user 12 saying each digit in the voice-dial telephone number. Ideally, this sample would include each digit in a variety of contexts to optimize system performance for a variety of telephone numbers. This could, however, complicate the enrollment process. One technique would be to force an initial enrollment session during which the caller would repeat a sequence of pre-selected digit strings. This is the above-described process of enrollment flow chart 30 of FIG. 2.

Another technique would be to simply use the first telephone call from user 12 to begin collecting digits. Consequently, the first call would not be secured. Subsequent calls would attempt to fetch templates, as described above, for each digit in the voice-dialed telephone number 24. Thus, if templates exist for all digits, the verification proceeds normally. Otherwise, the missing digits are either ignored or a speaker-independent template is substituted for the missing digits. In order to accommodate the gradual development of robust templates, the system of the preferred embodiment could gradually adjust operating thresholds to accommodate maturing templates.

A key feature of the preferred embodiment is that any telephone number may be a password. Also, voiceserver unit 18 need not know in advance which number will be spoken. Consequently, enrollment is complicated because of the need to get samples of every possible digit. This includes the numbers 1 through 9, as well as the words "0" and "oh." Moreover, it is also advisable to get samples of digits appearing in a variety of positions within a string (e.g., a "two" appearing in the string "two, three, four" can sound substantially different from the one appearing in "one, two, three"). Table 1 provides a list of digit strings to show an example of a set of strings in which each digit appears at least once in each position and exactly three repetitions of each digits are contained in the list of Table 1.

TABLE 1

| 1  | 1, 2, 3  |
|----|----------|
| 2  | 4, 5, 6  |
| 3  | 7, 8, 9  |
| 4  | 0, 1, 2  |
| 5  | 3, 4, 5  |
| 6  | 6, 7, 8  |
| 7  | 9, oh, 1 |
| 8  | 2, 0, 4  |
| 9  | oh, 3, 7 |
| 10 | 5, 6, 0  |
| 11 | 8, 9, oh |

The list of Table 1 is only exemplary, but simply illustrates the type of digit collection necessary for collecting stored digit voice template useable in the enrollment process 30 of FIG. 2.

Figure 3:
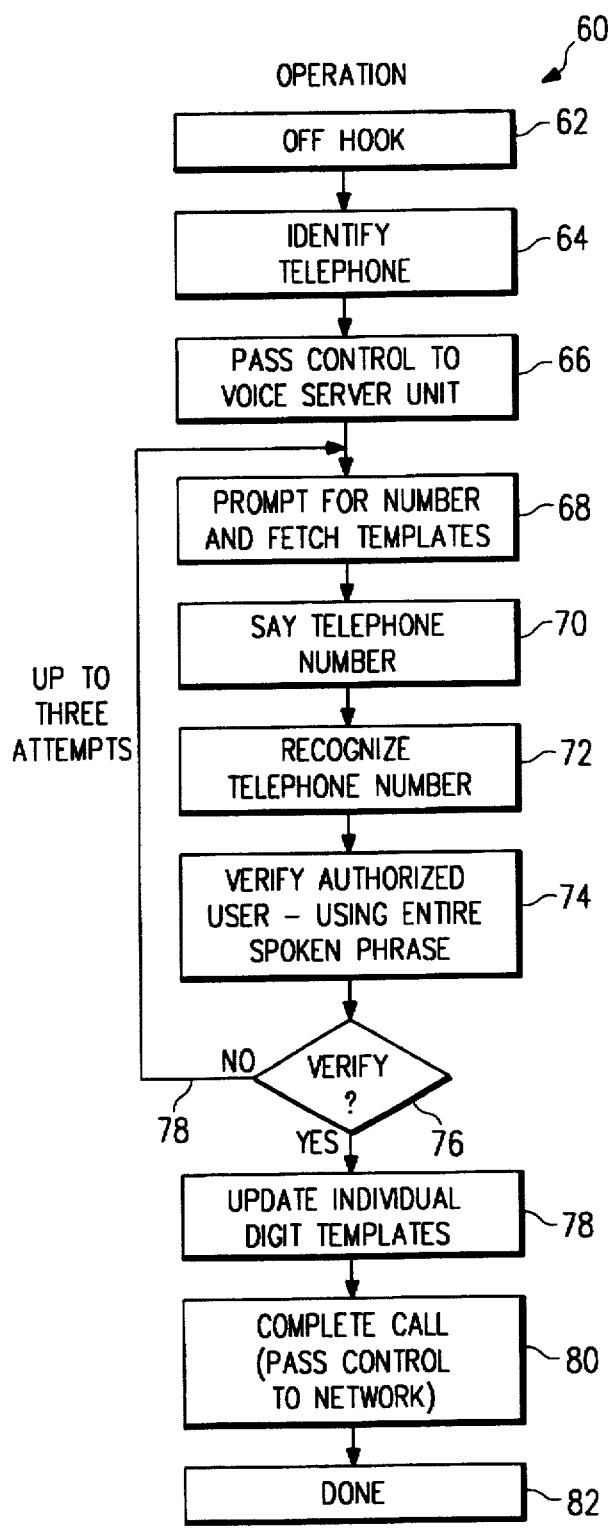
FIG. 3 illustrates the steps and data flow for an embodiment of the operation of the present invention.

FIG. 3 illustrates operation flow chart 60 that describes the operation portion of the preferred embodiment. Beginning at block 62, telephone unit 16 is taken off hook by user 12. Upon being taken off hook, by using either a unique telephone identification signal such as that used with most cellular telephone units or by using a unique identification number in an interactive process, telephone network 20 identifies the telephone unit 16. This takes place at block 64. After identification, control passes to block 66 where voiceserver unit 18 assumes telephone network 20 access control for telephone unit 16. At block 68, voiceserver unit 18 prompts user 12 for the telephone number and fetches templates from database 21. Then, at block 70, voiceserver unit 18 directs user 12 to say the telephone number he desires to call, such as telephone number 24. At step 72, voiceserver unit 18 recognizes the telephone number. Then, at block 74 voiceserver unit 18 verifies the identification of a caller based on a comparison of the entire spoken phrase that includes the spoken digits for telephone number 24 as compared with a stored template formed from a composed phrase. The composed phrase is composed of the stored numbers each corresponding to the spoken digits of the spoken phrase for telephone number 24. In essence, therefore, voiceserver unit 18 creates a new voice template for the spoken phrase that the spoken digits for telephone number 24 make up. This is compared to a stored voice template made of a composed phrase of stored digits corresponding to the spoken digits.

At block 76, a query occurs of whether the identification of the authorized user is verified. If not, control goes along path 78 to return to block 68 where the user is re-prompted for the telephone number. At this point, verification begins again, except that the results of the previous verification effort are used to weight subsequent verification attempts. Thus, for example, if a user has a frog in his throat or if telephone reception is severely hampered, it is possible to perform verification based on a very high correlation of a subsequent single effort. At the same time, verification may occur due to improvement over previous attempts for identity verification. In the preferred embodiment, up to three verification attempts are allowed. After the third unsuccessful verification attempt, voiceserver unit 18 denies user 12 access through telephone network 20.

If verification does occur, then at block 76 control goes to block 78 where voiceserver unit 18 updates the individual digit templates of database 21. Then, at block 80 voiceserver unit 18 permits the call to take place by passing control to telephone network 20. This completes the authorization process of the preferred embodiment as indicated by flow going to block 82.

Hence during system operation, by knowing the identity of the calling instrument, the present invention provides the advantage of knowing a priori the identity of the authorized user. The identity may be verified using any digit string with which it is presented. For example, if the task is to dial telephone number 24, the verification mode 60 is done "transparently" by using the voice patterns generated when the user voice-dials the desired telephone number. All that the method and system of the preferred embodiment require is that voiceserver unit 18, in the example of Table 1, download the set of 11 saved templates. Voiceserver unit 18 will then recognize the spoken telephone number and perform the new template-to-stored template comparison. The appropriate digits for the composed phrase that makes up the stored template will be determined by the recognized digit sequence of the spoken phrase.

In the above embodiment, voiceserver unit 18 is that equipment sold by Texas Instruments Incorporated under the tradename TI VoiceServer. And, although the above-described embodiment is for a method that can be performed at voiceserver unit 18, if telephone unit 16 were capable of performing the method of the preferred embodiment, certain advantages would result. Thus, instead of having a network-based system such as that of FIG. 1, if telephone unit 16 were able to perform enrollment and verification, then the spoken phrase voice recognition process of the preferred embodiment could be accomplished at telephone unit 16.

If the transparent voice authorization is performed at telephone unit 16, then not only may user 12 send out information to the telephone network 20, but also all electronics associated with telephone unit 16 could be controlled by transparent voice authorization. Thus, with the transparent voice authorization at telephone unit 16, any telephone numbers or other information that telephone unit 16 may store in a local memory circuit could be protected by having the voice authorization process of the preferred embodiment serve a locking function. Another advantage of having the speaker authorization take place at telephone unit 16 is that no airtime need be spent prior to user authorization.

Figure 4:
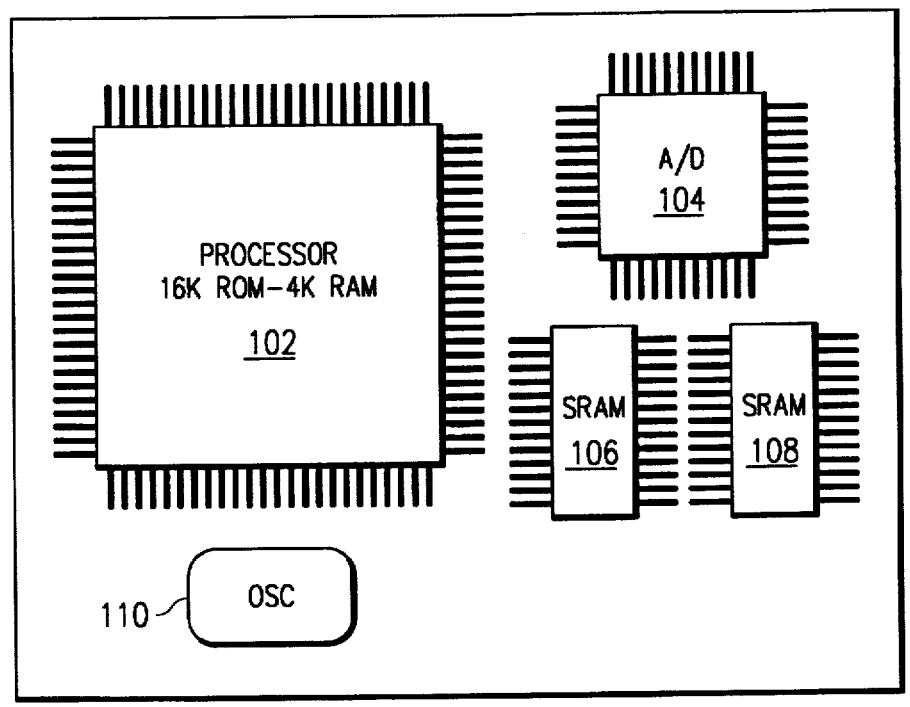
FIG. 4 illustrates an embodiment of the present invention that performs recognition and comparison at the local telephone unit.

FIG. 4 illustrates a minimal processor configuration for applying the telephone unit 16 adaptation of the preferred embodiment. In particular, voice processor circuit 100 includes digital signal processor 102 associated with analog-to-digital converter 104 and an SRAM bank consisting of SRAM 106 and SRAM 108. A 40.96 MHz crystal oscillator 110 provides the necessary timing signal for operation of circuitry of voice processor circuit board 100. This system is described in detail in the printed material entitled "Personal Communication System Voice Dialer Version 3.1" by Raj Pawate dated Jul. 6, 1992 and printed by Texas Instruments. This material is herein expressly incorporated by reference. In this embodiment, digital signal processor 102 is a Texas Instrument TMS320C53 processor that includes 16K of ROM and 4K of RAM. Analog-to-digital converter 104 is a 1–10 bit, 125 μsec. converter which may be a Texas Instruments TLC32044IAC using μLAW CODEC. SRAM 106 and 108 may be a 275 nsec. 32K by 8 SRAMS. Oscillator 110 is, preferably, a 40.96 MHz crystal oscillator.

The speech recognition system of FIG. 4 uses a Hidden Markov Modeling (HMM) algorithm for speech recognition and includes three computational processes running together. They include a feature extractor, a word hypothesizer, and a sentence hypothesizer. The feature extractor reduces the continuous speech to a series of 20-millisecond frames or states whose features are reduced to a finite set called a generalized set feature or GSF. The compute word and compute sentence are the HMM models that guide the recognition process. These three processes interact such that the feature extractor feeds the word hypothesizer which is no longer anonymous, but guided by a sentence hypothesizer. Hence, recognition is accomplished on a state-by-state basis and is guided by a word hypothesizer which is further guided by a sentence hypothesizer. The HMM processor at any level may be expressed in terms of mathematical probabilities as the likelihood that one state follows another. If the vocabulary is not expansive, and the sentence structure is non-infinite, then it is a simple process to predict the next state given the present and past states. This is accomplished by storing frames of extract features along paths that terminate at unique solution end points. Hence, paths scored at the same level point to word level which point to sentence level solution sets. All along the way, probabilities are calculated and assigned in guiding the process.

In summary, there is provided a transparent telephone system voice authorization method and system that protects against the unauthorized use of a telephone system associated with a continuous-digit voice recognition server unit system connected to a telephone network. The method and system comprise the steps and associated circuitry for receiving from the telephone system a spoken phrase having a plurality of digits and converting the spoken phrase to a telephone number. The telephone number is transmitted to the telephone network and the spoken phrase is recorded in the voice recognition server unit. The invention forms a new voice template from the spoken phrase and compares the new voice template with a stored voice template formed from a composed phrase of stored digits corresponding to the spoken digits. The composed phrase may use both speaker-dependent and speaker-independent stored digits. Furthermore, the invention permits use of the telephone network through the telephone system in the event that the new voice template corresponds to a sufficient degree with the stored voice template.

Although the present invention has been described in detail, it should be understood that various changes, substitutions, and alterations may be made hereto without departing from the spirit and scope of the invention as defined by the appended claims.

What is claimed is:

1. A substantially transparent telephone unit voice authorization system for protecting against an unauthorized use of a telephone unit associated with a continuous digit voice recognition server system and a telephone network, the transparent telephone unit voice authorization system comprising:

a telephone unit for transmitting a phrase of an unknown user consisting of a plurality of spoken digits consisting of a telephone number;

an authorized user enrollment system for accepting voiced phrases consisting of spoken digits and making user dependent stored voice digit templates from said voiced phrases;

a voice recognition server system for receiving and recognizing said phrase from said unknown user, said voice recognition server system further for transmitting said telephone number to the telephone network for the telephone network to call a receiving telephone having a destination defined by said telephone number;

template forming circuitry associated with said voice recognition server system for forming a new voice template from said user dependent stored voice digit templates in the sequence of spoken digits from said phrase from said unknown user;

comparison circuitry associated with said voice recognition server system for comparing said new voice template to said phrase from said unknown user; and access circuitry associated with said voice recognition server system for permitting use of the telephone network through said telephone unit thereby allowing the unknown user to communicate with another at the receiving telephone destination in an event that said new voice template corresponds to a predetermined degree with said phrase from said unknown user and denying use of the telephone network through the telephone unit in an event that said new voice template does not correspond to at least a pre-determined degree with said phrase from said unknown user.

2. The system of claim 1, further comprising prompt circuitry associated with said voice recognition server system for playing a prompt message in the event that said new voice template differs from said phrase from said unknown user by at least said predetermined degree.

3. The system of claim 1, further comprising combining circuitry associated with said voice recognition server system for iteratively combining said new voice template with said user dependent stored voice digit templates for updating said user dependent stored voice digit templates.

4. The system of claim 3, wherein said template forming circuitry forms said user dependent stored voice digit templates using speaker-independent templates for one or more digits of said user dependent stored voice digit templates in an event that fewer than a pre-determined number of new voice templates have been iteratively combined with said user dependent stored voice digit templates after use of the telephone unit is permitted.

5. A substantially transparent telephone system voice authorization method for protecting against an unauthorized use of a telephone system unit associated with a continuous-digit voice recognition server system and a telephone network, the method comprising the steps of:

receiving from an authorized user of said telephone unit a plurality of phrases comprising at least one spoken digit;

forming and storing a plurality of user dependent stored voice digit templates from said plurality of phrases;

receiving from an unknown user of said telephone unit a spoken phrase consisting of a plurality of digits which comprise a telephone number;

comparing said of said unknown user spoken phrase to said user dependent stored voice digit templates which are voice templates of said authorized user of said telephone unit;

permitting use of the telephone network through said telephone unit thereby allowing the unknown user to communicate with another at a destination defined by said telephone number in an event that said plurality of digits of said spoken phrase of said unknown user corresponds to at least a predetermined degree with said user dependent stored voice digit templates; and denying use of the telephone network through said telephone unit in an event that said plurality of digits of said spoken phrase of said unknown user does not correspond to at least a pre-determined degree with said user dependent stored voice digit templates.

6. The method of claim 5, wherein said spoken phrase of said unknown user is compared to said user dependent stored voice digit templates by making a new voice template consisting of more than one of the user dependent stored voice digit templates combined in a pattern of the spoken digits of said telephone number spoken by said unknown user and then comparing the new voice template with said spoken phrase of said unknown user.

7. The method of claim 5, wherein said new voice template includes one or more user independent digit templates in addition to the user dependent stored voice digit templates.

8. The method of claim 6, wherein said receiving a plurality of phrases of the authorized user is accomplished by assuming a first caller from said telephone unit is the authorized user and building the user stored voice dependent digit templates from spoken digits on a first access to said voice recognition server system from said telephone unit.

9. The method of claim 6, further comprising the step of playing a prompt message in an event that said new voice template differs from said spoken phrase of said unknown user by at least a pre-determined degree.

10. The method of claim 6, further comprising the step of iteratively combining new voice templates with said user dependent stored voice digit templates for updating said user dependent stored voice digit templates after use of the telephone unit is permitted.

11. The method of claim 10, further comprising the step of forming said user dependent stored voice digit templates from speaker-independent templates for one or more digits of said user dependent stored voice digit templates in an event that fewer than a pre-determined number of said new voice templates have been iteratively combined with said user dependent stored voice digit templates.

* * * * *